(12) United States Patent
Picker et al.

(10) Patent No.: US 7,644,077 B2
(45) Date of Patent: Jan. 5, 2010

(54) METHODS, COMPUTER READABLE MEDIUMS AND SYSTEMS FOR LINKING RELATED DATA FROM AT LEAST TWO DATA SOURCES BASED UPON A SCORING ALGORITHM

(75) Inventors: Saar Picker, Bellevue, WA (US); Paul Deeds, Seattle, WA (US)

(73) Assignee: Microsoft Corporation, Redmond, WA (US)

( * ) Notice: Subject to any disclaimer, the term of this patent is extended or adjusted under 35 U.S.C. 154(b) by 394 days.

(21) Appl. No.: 10/970,602

(22) Filed: Oct. 21, 2004

(65) Prior Publication Data

US 2006/0089948 A1    Apr. 27, 2006

(51) Int. Cl.
*G06F 17/30* (2006.01)
*G06F 15/16* (2006.01)

(52) U.S. Cl. .................... 707/6; 707/100; 707/101; 705/2

(58) Field of Classification Search .................... None
See application file for complete search history.

(56) References Cited

U.S. PATENT DOCUMENTS

| | | | |
|---|---|---|---|
| 4,879,611 A | 11/1989 | Fukui et al. | |
| 5,189,630 A | 2/1993 | Barstow et al. | |
| 5,541,738 A | 7/1996 | Mankovitz | |
| 5,977,964 A | 11/1999 | Williams et al. | |
| 5,995,155 A | 11/1999 | Schindler et al. | |
| 6,035,308 A * | 3/2000 | Yano et al. | 715/501.1 |
| 6,049,333 A | 4/2000 | LaJoie et al. | |
| 6,052,145 A | 4/2000 | Macrae et al. | |
| 6,061,680 A | 5/2000 | Scherf et al. | |
| 6,112,203 A * | 8/2000 | Bharat et al. | 707/5 |
| 6,154,773 A | 11/2000 | Roberts et al. | |
| 6,268,849 B1 | 7/2001 | Boyer et al. | |
| 6,438,579 B1 | 8/2002 | Hosken | |

(Continued)

FOREIGN PATENT DOCUMENTS

EP    1558028 A2    7/2005

(Continued)

OTHER PUBLICATIONS

Silverberg E., "Using the Program Guide in Windows XP Media Center Edition," Using Windows XP, Feb. 9, 2004, 8 pages, Microsoft Corporation, U.S.A.

(Continued)

*Primary Examiner*—Cam Y Truong
*Assistant Examiner*—Dung K Chau
(74) *Attorney, Agent, or Firm*—Senniger Powers LLP

(57) ABSTRACT

A method for linking related data, such as metadata, from at least two data sources. The method includes formatting items of data of the data sources according to attributes. The method also executes a scoring algorithm for one or more of the attributes to generate a score for one or more sets of the formatted items of data, each of the sets includes an item of data from one data source and an item of data from another data source. Finally the method identifies related items of data of the separate data sources based upon the generated scores to facilitate linking related data of the two data sources. The method may also provide a link between data items of the data sources.

34 Claims, 5 Drawing Sheets

U.S. PATENT DOCUMENTS

| | | | |
|---|---|---|---|
| 6,545,209 B1 | 4/2003 | Flannery et al. | |
| 6,571,392 B1 | 5/2003 | Zigmond et al. | |
| 6,615,248 B1 | 9/2003 | Smith | |
| 7,072,846 B1 | 7/2006 | Robinson | |
| 7,167,858 B2 * | 1/2007 | Naeymi-Rad et al. | 707/6 |
| 2002/0083464 A1 | 6/2002 | Tomsen et al. | |
| 2002/0157099 A1 | 10/2002 | Schrader et al. | |
| 2002/0157101 A1 | 10/2002 | Schrader et al. | |
| 2002/0166123 A1 | 11/2002 | Schrader et al. | |
| 2003/0023975 A1 | 1/2003 | Schrader et al. | |
| 2003/0028796 A1 | 2/2003 | Roberts et al. | |
| 2003/0028882 A1 | 2/2003 | Davis et al. | |
| 2003/0051246 A1 | 3/2003 | Wilder et al. | |
| 2003/0070170 A1 | 4/2003 | Lennon | |
| 2003/0106058 A1 * | 6/2003 | Zimmerman et al. | 725/46 |
| 2003/0225777 A1 * | 12/2003 | Marsh | 707/101 |
| 2004/0002981 A1 * | 1/2004 | Bernhardt et al. | 707/100 |
| 2004/0003403 A1 * | 1/2004 | Marsh | 725/53 |
| 2004/0040041 A1 | 2/2004 | Crawford | |
| 2004/0154039 A1 | 8/2004 | Simms et al. | |
| 2004/0177093 A1 * | 9/2004 | Mullins | 707/104.1 |
| 2004/0216156 A1 | 10/2004 | Wagner | |
| 2005/0005290 A1 | 1/2005 | Kamen | |
| 2005/0131762 A1 * | 6/2005 | Bharat et al. | 705/14 |
| 2006/0004814 A1 * | 1/2006 | Lawrence et al. | 707/101 |
| 2006/0036368 A1 * | 2/2006 | Chen et al. | 702/19 |

FOREIGN PATENT DOCUMENTS

| | | |
|---|---|---|
| WO | WO 96/31980 A1 | 10/1996 |
| WO | WO 00/33576 A1 | 6/2000 |
| WO | WO 01/39494 A1 | 5/2001 |

OTHER PUBLICATIONS

Unknown, "Windows XP Media Center Edition 2005 Experience," Oct. 12, 2004, 1 page, Microsoft Corporation, U.S.A.

Unknown, "Electronic Programme Guide," Digital Cable TV, printed Sep. 22, 2005, 1 page, Hathway Datacom Pvt. Ltd., India.

Unknown, "Shaw Cable and Satellite: Star Choice Interactive Program Guide," Case Studies, printed Sep. 22, 2005, 3 pages, GIST Communications, Inc., U.S.A.

* cited by examiner

FIG. 1

First Data Source — 29 ⟶ 21

| Item of Data | First Attribute | Second Attribute | Third Attribute | ... Attribute |
|---|---|---|---|---|
| First Data Item | First String | Third String | | ... |
| Second Data Item | | | | ... |
| Third Data Item | | | | ... |
| ... Data Item | ... | ... | ... | ... |

27 ⟶

Second Data Source — 29 ⟶ 23

| Item of Data | First Attribute | Second Attribute | Third Attribute | ... Attribute |
|---|---|---|---|---|
| First Data Item | Second String | Fourth String | | ... |
| Second Data Item | Fifth String | Sixth String | | ... |
| Third Data Item | | | | ... |
| ... Data Item | ... | ... | ... | ... |

Jones Movie Data Source — 29 ⟶ 31

| Movie ID | Title | Release Date | Run Length | MPAA Rating |
|---|---|---|---|---|
| First Data Item | The 20th Century with Mike Wallace: Ourselves, Our Bodies | 1996-01-01 01:01:00 | 50 | Null |
| Second Data Item | Dial M for Murder | 1982 | 105 | PG |
| Third Data Item | Murder! | 1930 | 93 | Not rated |

Smith Movie Data Source — 29 ⟶ 33

| Movie ID | Movie Name | Release Date | Rating | Run Time |
|---|---|---|---|---|
| First Data Item | The 20th Century with Mike Wallace: Ourselves, Our Bodies | 1996-01-01 01:01:00 | Null | 50 |
| Second Data Item | The 20th Century with Mike Wallace: The Feminist Movement and the Battle Over Abortion | 1996-01-01 01:01:00 | Null | 47 |
| Third Data Item | Dial M for Murder | 1954 | Not rated | 105 |

FIG. 3

| Comparison | Title and Movie Name Score | Release Date Score | MPAA Rating Score | Run Length Score | Total Match Score (weighted 100, 100, 40, 75, respectively) | Match? |
|---|---|---|---|---|---|---|
| First Data Item of the Jones Movie Data Source and the First Data Item of the Smith Movie Data Source | 100 | 5 | 2 | 5 | 10,995 | Yes |
| First Data Item of the Jones Movie Data Source and the Second Data Item of the Smith Movie Data Source | 51 | 5 | 2 | 3 | 5,905 | No |
| First Data Item of the Jones Movie Data Source and the Third Data Item of the Smith Movie Data Source | 0 | 0 | 2 | 0 | 80 | No |
| Second Data Item of the Jones Movie Data Source and the First Data Item of the Second Data Source | 0 | 0 | 2 | 0 | 80 | No |
| Second Data Item of the Jones Movie Data Source and the Second Data Item of the Smith Movie Data Source | 0 | 0 | 2 | 0 | 80 | No |
| Second Data Item of the Jones Movie Data Source and the Third Data Item of the Smith Movie Data Source | 100 | 0 | 0 | 5 | 10,375 | Yes |
| Third Data Item of the Jones Movie Data Source and the First Data Item of the Smith Movie Data Source | 0 | 0 | 2 | 0 | 80 | No |
| Third Data Item of the Jones Movie Data Source and the Second Data Item of the Smith Movie Data Source | 0 | 0 | 2 | 0 | 80 | No |
| Third Data Item of the Jones Movie Data Source and the Third Data Item of the Smith Movie Data Source | 67 | 0 | 5 | 2 | 7,050 | No |

METHODS, COMPUTER READABLE MEDIUMS AND SYSTEMS FOR LINKING RELATED DATA FROM AT LEAST TWO DATA SOURCES BASED UPON A SCORING ALGORITHM

TECHNICAL FIELD

Embodiments of the present invention relate to the field of linking related data sources, such as metadata sources, which may be associated with media content, located in multiple sources. In particular, embodiments of this invention relate to formatting items of data of metadata sources according to attributes, executing a scoring algorithm for one or more of the attributes for generating a score for combinations of data comprising an item of data from differing data sources, and identifying related items of data of the differing data sources based upon the generated scores.

BACKGROUND OF THE INVENTION

The present invention is directed to linking related data sources, in particular those data sources comprising metadata, although linking data sources of any type is contemplated as within the scope of the claimed invention. Generally, metadata is defined as data about data. Metadata commonly describes a tangible thing, such as a movie, or motion picture, an audio compact disc (CD), a digital video disc (DVD), a theatrical performance, or a concert, to name a few. Metadata sources often comprise multiple items of data. For example, a movie data source, such as a database, may include data describing multiple movies. The collection of information about a particular movie in the data source comprises a separate item of data. Moreover, each of these items of data representing a movie may then be divided into a common set of distinct attributes. Each of these attributes describes a particular feature of the data item, or movie. For a movie data source, of which there may be several, attributes might include movie title, release year, director, running time, and cast, among others. For a data source containing theaters showing movies, attributes might include theater name, address, city, state, and zip code, among others. These common attributes of any one data source typically apply to each of the data items contained in the source.

Conventional search algorithms use sophisticated searching techniques to find relevant metadata about a particular tangible thing, such as a movie. Although the searching methods are computationally sophisticated, such searching methods are prone to error because they often rely upon insufficient data, which may be mistakenly assumed to be correct. Moreover, such techniques require a great deal of processing capacity, which increases the cost of locating information and the time required to locate such information.

Such techniques are particularly prone to errors and subject to unreasonable processing costs and delay where metadata is located in several data sources. Accordingly, a solution that effectively uses simpler computational methods to match data items of multiple data sources by linking the information of the data sources together is desired.

SUMMARY OF THE INVENTION

Embodiments of the invention overcome one or more deficiencies in the prior art by providing, among other things, identification of common data items among many data sources, thereby leading to a more comprehensive, and ultimately correct, picture of the data sought to be understood.

The methods or systems of the present invention utilize as many identifiable attributes of the data sources as possible, thereby minimizing reliance upon any single piece of potentially erroneous data. One or more of the attributes of the metadata in a given data source may be matched, or interlinked, to the corresponding attributes of one or more other data sources. The interlinking of many attributes of several data sources differentiates such a process from conventional search algorithms, in that such interlinking uses simpler computational methods, requiring less computing power and time, yet including as many attributes as can be identified to increase precision in making a match by reducing the reliance on any one piece of potentially erroneous data to support a match. Thus, with each additional attribute identified and utilized in comparing the data sources, match quality increases. This way, computationally quick and simple algorithms may yield high quality results with relatively little processing, compared to the traditional searching algorithms. Moreover, by matching data items of one data source with related data items of other data sources, the overall amount of metadata available to a user regarding each data item increases, effectively linking the information of two or more data sources together.

Accordingly, a method (or a computer-readable media or a system) for linking related data from at least two data sources—the method comprising formatting items of data of a first data source according to attributes; formatting items of data of a second data source according to the attributes; executing a scoring algorithm for one or more of the attributes for generating a score for combinations of data comprising an item of data from the first data source and an item of data from the second data source; and identifying related items of data of the first and second data sources based upon the generated scores—is desired to address one or more of these and other disadvantages. For example, such a method may be well-suited for merging metadata databases or data streams relating to motion pictures or music, generally as set forth above.

In accordance with one aspect of the invention, a method for linking related data from at least two data sources comprises formatting items of data of a first data source according to attributes and formatting items of data of a second data source according to the attributes. The method further comprises executing a scoring algorithm for one or more of the attributes to generate a score for one or more sets of the formatted items of data. Each of the sets comprise an item of data from the first data source and an item of data from the second data source. The method further comprises identifying related items of data of the first and second data sources based upon the generated scores.

In accordance with still another aspect of the present invention, one or more computer-readable media have computer-executable components for linking related data from at least two sources of data. The components comprise an attribute component for formatting items of data of a first data source according to a plurality of predetermined attributes. The attribute component further formats items of data of a second data source according to the attributes. The components also comprise an engine component for executing a scoring algorithm for one or more of the attributes for generating a score for sets of data. The sets of data each comprise an item of data of the first data source formatted by the attribute component and an item of data from the second data source formatted by the attribute component. The components also comprise a filter component identifying related items of data formatted by the attribute component based upon the scores generated by the engine component.

In accordance with yet another aspect of the present invention, a system for linking related data from at least two sources of data comprises a first data feed, a second data feed, and a processor for receiving the first and second data feeds. The processor is configured to format items of data of the first data feed according to attributes and format items of data of the second data feed according to the attributes. The processor is also configured to execute a scoring algorithm for one or more of the attributes to generate a score for one or more sets of the formatted items of data. Each of the sets comprises an item of data from the first data feed and an item of data from the second data feed. The processor is also configured to identify related items of data of the first and second data feeds based upon the generated scores.

In accordance with still another aspect of the present invention, a method for establishing a link between related metadata from at least two sources of metadata, the metadata including property data associated with a media file accessible by a client, comprises formatting items of data of a first metadata source according to attributes and formatting items of data of a second metadata source according to the attributes. The method further comprises executing a scoring algorithm identifying related items of data generally as set forth above. The method also establishes at least one link between data items of the first metadata source related to data items of the second metadata source identified as being related and generates a user interface displaying the established link.

Alternatively, the invention may comprise various other methods and apparatuses.

Other features will be in part apparent and in part pointed out hereinafter.

BRIEF DESCRIPTION OF THE DRAWINGS

FIG. 1 is a generic arrangement of two data sources comprising data items with multiple attributes;

FIG. 2 is an exemplary arrangement of two data sources comprising data items with multiple attributes;

FIG. 3 is an exemplary scoring table depicting the scoring of potentially related data items from the two data sources of FIG. 2;

Corresponding reference characters indicate corresponding parts throughout the drawings.

DETAILED DESCRIPTION OF THE INVENTION

Figure 4:
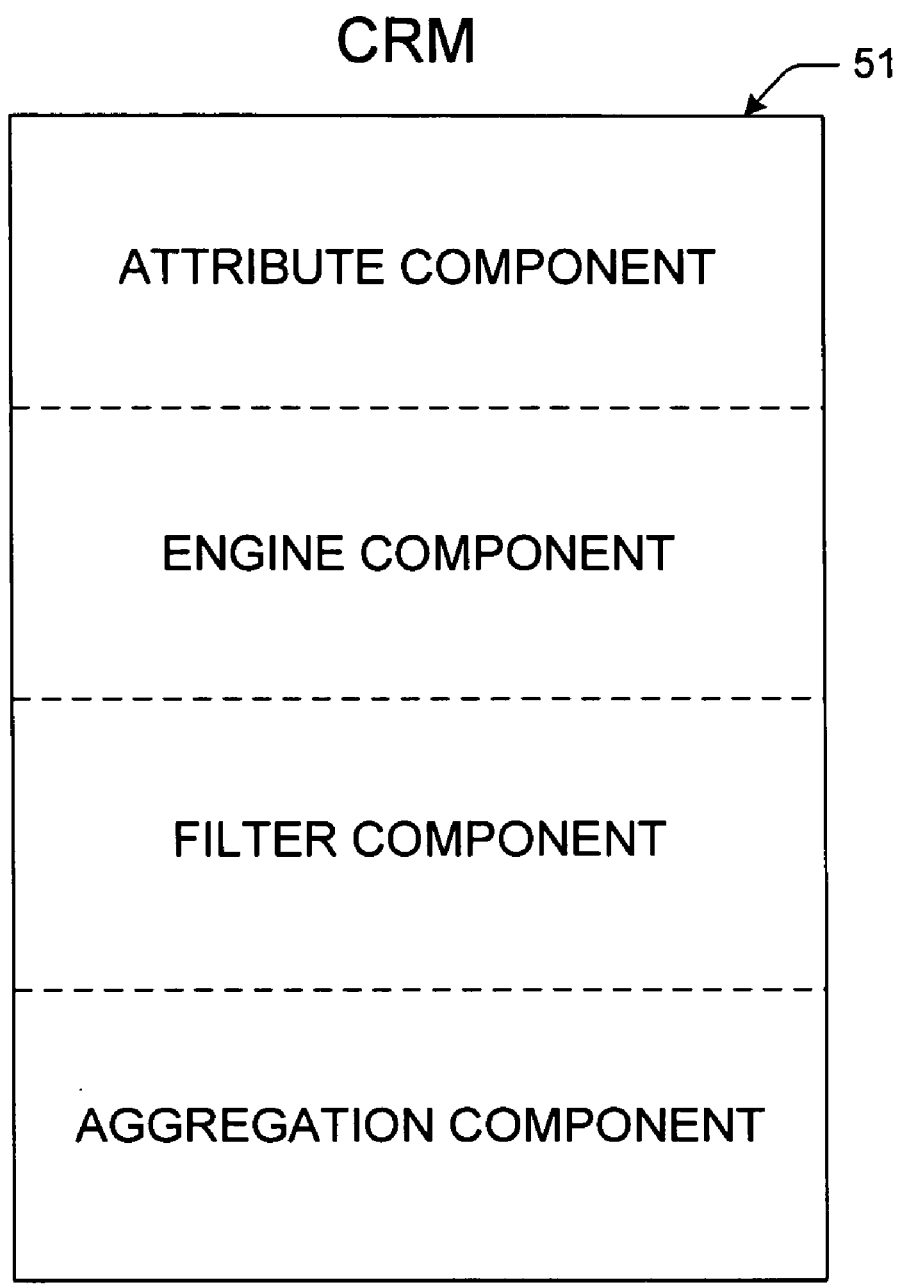
FIG. 4 is a diagram of a computer-readable media (CRM) of the present invention.

The inventions disclosed herein may be applied to any data sources having related data, such as metadata, sought to be linked. One application of this invention is for producing identification mappings, or match lists, interlinking similar data items from different metadata sources, such as databases. These data items may relate to movies, music albums, movie theaters, etc. In one example, the metadata sources may comprise property data associated with media files, such as at least one of video files, audio files, movies, music, executable files, and document files. This mapping of similar data items allows for aggregation of multiple data sources, by linking related items, to create a more complete and accurate directory linking the data items being mapped. Overlapping data can be compared for errors, and utilized as a tool for determining the strength, or veracity, of the link itself. Also, since no one data source is comprehensive, interlinking allows for creating a distinct union of information by consolidating overlapping items. Lastly, interlinking can ease data provider transition since it allows for diversification of information sources. Systems based on interlinking generate aggregates of information from multiple sources, such that loss of a single data source (due to contract expiration, data source delivery failure, etc.) is no longer catastrophic. And a new data source can be readily added to supplement areas where information coverage is lost.

In one embodiment, depicted in FIG. 1, the invention comprises a method for linking related data from at least two data sources. The at least two data sources may be constructed with various data structures comprising at least one of a database file, an xml document, and a delimited text file, among others. The terms data source and metadata source are used interchangeably throughout this application and may encompass any type of data supply, whatever format or method of delivery. In addition, a data feed, discussed in detail below, comprises a stream of data items coming from a data source. Data feeds may be utilized in much the same manner as will be described below with respect to data sources. FIG. 1 depicts a generic layout of such a first data source, generally indicated 21, and a second data source, generally indicated 23, for use with such a method. Each data source 21, 23 comprises multiple data items, generally indicated 27, only some of which are depicted. For example, the first data source 21 includes a first data item, a second data item, and a third data item, while the second data source 23 also includes a first data item, a second data item, and a third data item. It should be understood that each data source 21, 23 may be comprised of additional data items 27 not shown in FIG. 1. Each data item 27 of a given data source 21, 23, is composed of a set of attributes 29. First, second, and third attributes are depicted in FIG. 1, although one skilled in the art would readily understand that additional attributes 29 may be included without departing from the scope of the claimed invention. These attributes 29 may further include a set of base attributes common to most, or some, of the data sources 21, 23 under consideration for linking potentially related data items 27. Base attributes are those which will be utilized in the method for linking related data. A data source 21, 23 may have a number of attributes 29, but only a portion of those attributes will be relied upon for linking data items 27. In one example, the data items 27 relate to movies and the attributes 29 are at least two of movie title, movie run time, Motion Picture Association of America (MPAA) rating, movie genre, releasing studio, cast listing, cast member, release date, release year, and director. Derived attributes can also be defined by algorithmic processing of one or more of the other attributes 29. For example, two attributes 29 may be joined to one another (e.g., joining a city attribute and a state attribute of a particular movie theater), or an attribute may be split into more than one string (e.g., splitting multiple word attributes into separate words). Examples of such attribute formatting will be discussed in greater detail below.

Before the potentially related data items 27 from different data sources 21, 23 can be compared with one another, the data may be formatted to bring the data items into a readily comparable format. For example, items of data 27 of a first data source 21 may be formatted according to the attributes 29, as with items of data of the second data source 23. For each of the first and second data sources 21, 23, the attributes 29 may be different. For example, FIG. 2 depicts an exemplary layout of two data sources, a fictional Jones movie data source, generally indicated 31, and a fictional Smith movie data source, generally indicated 33, each data source having multiple data items 27 with multiple attributes 29. Such formatting may take many forms, but in one example comprises parsing items of data 27 into data strings having a pre-defined format. Such pre-defined formats might include removing portions of data strings that are unrelated to the data item, related to formatting only, or more closely related to another attribute of the data item. In another example, attributes having different names, but corresponding to the same type of information, may be compared with one another. For example, data source 31 refers to "Title" and "MPAA Rating" attributes, which correlate to the "Movie Name" and "Rating" attributes of data source 33. As will be made apparent in further discussion below and would be readily understood by one skilled in the art, the method may further comprise formatting items of data 27 of a third data source according to the attributes.

Once the data items 27 are formatted for ready comparison of the data sources 21, 23 and 31, 33, the method further comprises executing a scoring algorithm for one or more of the attributes 29 to generate a score for one or more sets of the formatted items of data comprising an item of data from one of the data sources and an item of data from another of the data sources. In one example, each of the sets comprises an item of data 27 from the first data source 21, 31 and an item of data from the second data source 23, 33. For each base attribute 29, those attributes relied upon for linking related data from at least two data sources, a match function is defined such that an integer score is returned for the chosen base attribute values of any two data items 27, each from a different data source. The integer score is the attribute match score for the chosen attribute 29 for a particular pair of data items 27, one from each data source. The attribute match score is calculated for all base attributes in turn for the selected pair of data items 27.

For example, FIG. 3 depicts an exemplary scoring table, generally indicated 37, depicting the scoring of potentially related data items 27 from the two data sources 31, 33 depicted in FIG. 2. In this example, executing the scoring algorithm may be separated into multiple sub-steps. As shown generally in FIG. 1, a first attribute of the one or more of the attributes 29 of a first data item of the first data source 21 comprises a first string. Similarly, a corresponding first attribute of a first data item of the second data source 23 comprises a second string. Such strings may comprise data of many types within the scope of the claimed invention. Once the strings are identified, executing the scoring algorithm for the first attributes comprises performing a string comparison between the first string and the second string and scoring the comparison of the first attribute of the first data item of the first data source 21 and the corresponding first attribute of the first data item of the second data source 23 according to the scoring algorithm. In other words, this string comparison compares a single data item from each data source 21, 23 based upon a first attribute. The details of the comparison and scoring will be discussed in greater detail below, but FIG. 3 depicts an exemplary score of 100 for the comparison of the first attribute (i.e., Title and Movie Name Score) of the first data item of the first data source, or Jones movie data source 31, and the corresponding first attribute of the first data item of the second data source, or Smith movie data source 33, utilizing the data from the data sources of FIG. 2.

Once a score is calculated for the first attribute of this set of data items 27, a second attribute of the one or more of the attributes 29 of the first data item of the first data source 21 comprises a third string (FIG. 1) and a corresponding second attribute of the first data item of the second data source 23 comprises a fourth string. Executing the scoring algorithm for the second attributes comprises performing a string comparison between the third string and the fourth string and scoring the comparison of the second attribute of the first data item of the first data source 21 and the corresponding second attribute of the first data item of the second data source 23 according to the scoring algorithm. In other words, this step compares the same first data items from each data source 21, 23 based upon a second attribute. As with the first attribute, FIG. 3 depicts an exemplary score of 5 for the comparison of the second attribute (e.g., Release Date Score) of the first data item of the first data source, or Jones movie data source 31, and the corresponding second attribute of the first data item of the second data source, or Smith movie data source 33, utilizing the data from the data sources of FIG. 2. Such steps of comparing the potentially related data items 27 may be repeated for additional attributes 29, but the present description will be limited to two attributes for simplicity in describing the invention.

Once each of the attributes 29 for the first data items 27 are compared (e.g., first and second attributes), the executing the scoring algorithm comprises combining the score from the string comparison between the first string and the second string and from the string comparison between the third string and the fourth string to produce a total match score for the first data items. This total match score is indicative of the relative likelihood that the first data item of the first data source 21 and the first data item of the second data source 23 correspond to one another.

To further facilitate understanding the relationship between such potentially related data items 27, executing the scoring algorithm may further comprise weighting the score for the first attribute of the first data items before the combining, and weighting the score for the second attribute of the first data items before the combining. By weighting the scores for each attribute 29 before combining them to produce the total match score for the selected pair of data items 27, the relative influence of the attributes in the total match score may be controlled. Considering the movie metadata example of FIGS. 2 and 3, an attribute 29 with ample detail and low repetition among different data items 27, such as movie title, may be a better indicator of potentially matched items than another attribute that provides little detail and high repetition among different data items, such as MPAA ratings. In such an example, the score for the movie title attribute may merit a larger weighting than the score for the MPAA rating attribute, such that the total match score reflects the likely match of the more complex title over the simpler MPAA rating. Exemplary weighting coefficients will be discussed in detail below along with an example of the scoring algorithm.

The previous substeps of the executing the scoring algorithm compared two attributes 29 for a single set of data items comprising a first data item of the first data source 21 and a first data item of a second data source 23. Other data items of the first and second data sources 21, 23 must also be compared. For example, the first attribute of a second data item of the second data source comprises a fifth string (FIG. 1), such that executing the scoring algorithm for the first attributes further comprises performing a string comparison between the first string and the fifth string and scoring the comparison of the first attribute of the first data item of the first data source 21 and a corresponding first attribute of the second data item of the second data source 23 according to the scoring algorithm. This substep compares the first attribute of the first data item of the first data source 21 with the corresponding first attribute of the second data item of the second data source 23. The details of the comparison and scoring will be discussed in greater detail below, but FIG. 3 depicts an exemplary score of 51 for the comparison of the first attribute (e.g., Title and Movie Name Score) of the first data item of the first data source, or Jones movie data source 31, and the corresponding first attribute of the second data item of the second data source, or Smith movie data source 33, utilizing data from the data sources 31, 33 of FIG. 2.

Similarly, the second attribute of the second data item of the second data source 23 comprises a sixth string (FIG. 1). Executing the scoring algorithm for the second attributes further comprises performing a string comparison between the third string and the sixth string and scoring the comparison of the second attribute of the first data item of the first data source 21 and a corresponding second attribute of the second data item of the second data source 23 according to the scoring algorithm. As with the first attribute, FIG. 3 depicts an exemplary score of 5 for the comparison of the second attribute (e.g., Release Date Score) of the first data item of the first data source, or Jones movie data source 31, and the corresponding second attribute of the second data item of the second data source, or Smith movie data source 33, utilizing the data from the data sources of FIG. 2.

As with the scores for the first and second attributes of the first data items, executing the scoring algorithm may further comprise combining the score from the string comparison between the first string and the fifth string (e.g., score of 51) and from the string comparison between the third string and the sixth string (e.g., score of 5) to produce a total match score for the first data item of the first data source 21 and the second data item of the second data source 23. In addition, the executing the scoring algorithm further comprises weighting the score for the first attribute of the first and second data items of the first and second data sources 21, 23, respectively, before the combining, and weighting the score for the second attribute of the first and second data items of the first and second data sources, respectively, before the combining. As discussed above, weighting the scores for each attribute 29 before combining them into the total match score influences the relative importance of the attributes. FIG. 3 depicts an exemplary weighted score of 10,995 for the comparison of four attributes of the first data item of the first data source, or Jones movie data source 31, and the corresponding four attributes of the first data item of the second data source, or Smith movie data source 33, utilizing the data from the data sources of FIG. 2. The other weighted scores for each of the sets of potentially related data items comprising a data item from the first data source, or Jones movie data source 31, and the second data source, or Smith movie data source 33, are also depicted in the chart of FIG. 3.

Once each of the sets of potentially related data items is assigned a total match score, the method may further comprise identifying related items of data 27 of the first and second data sources 21, 23 based upon the generated scores. In one example, the total match scores are calculated for multiple data sets for comparison to identify related items of data. Again, the present example discusses relatively few sets, but many additional sets comprising an item of data 27 from the first data source 21 and an item of data from the second data source 23 may be considered using the same scoring algorithm discussed above. In any event, identifying related items of data 27 of the first and second data sources 21, 23 based upon the generated scores further comprises linking the first data item of the first data source with the first data item of the second data source when two criteria are met. The first criterion requires that the total match score for the first data items of each of the first and second data sources 21, 23 is greater than the total match score for the first and second data items of the first and second data sources. The second criterion requires that the total match score for the first data items is greater than a threshold matching criterion. If both of these criteria are met, then the first data item of the first data source 21 is identified as related to the first data item of the second data source 23.

Similarly, identifying related items of data 27 of the first and second data sources 21, 23 based upon the generated scores also comprises linking the first data item of the first data source with the second data item of the second data source when two criteria are met. The first criterion requires that the total match score for the first and second data items 27 of the first and second data sources 21, 23, respectively, is greater than the total match score for first data items of each of the first and second data sources. The second criterion requires that the total match score for the first and second data items of the first and second data sources, respectively, is greater than a threshold matching criterion.

More generally speaking, identifying related items of data 27 of the first and second data sources 21, 23 based upon the generated scores comprises linking the first data item of the first data source with the first data item of the second data source when two criteria are met. First, the total match score for the first data items must be greater than the total match score for the first data item of the first data source 21 and any other data item of the second data source 23. Second, the total match score for the first data items must be greater than a threshold matching criterion.

Even more generally, identifying related items of data 27 of the first and second data sources 21, 23 based upon the generated scores comprises linking a data item of the first data source with a data item of the second data source when a total match score for the data items is greater than any total match score for the data item of the first data source and any other data item of the second data source and the total match score for the data items is greater than a threshold matching criterion. This more general recitation of the identification process is helpful in understanding that each of the data sources 21, 23 can comprise a large number of data items 27. To link any two related data items 27, one from each data source 21, 23, the total match score of those data items must be larger than any total match score from a set including one of the data items.

The two criteria are each important to the identifying process. The first criterion, that the related data set have a total match score greater than any other data set sharing a data item of the related set, ensures that the set of data items identified is the most likely to be related. This criterion identifies the set with the highest score, which should correspond to the set of data items 27 most likely to be related. The second criterion requires that the match score be larger than a particular threshold matching criterion, thereby minimizing the likelihood of identifying a related set of data items 27 where the data items are merely the most similar to one another, but clearly do not share enough attributes 29 in common to create a match. It should also be noted here that in some cases, two data items 27 found in a single data source 21, 23 may contain identical, or nearly identical, information, such that the matching scores for sets of data containing one of those two data items may be identical. For example, in a comparison of movie data sources, the same movie may be listed twice, once for a United States release, and again for a European release. Other movies in the same data source may also be listed twice. In this scenario, it may be beneficial to add a third criterion, whereby some subset of the data source, such as only those movies released in the United States, is evaluated, rather than the entire data source. This selection of a subset of the data source may also be incorporated into the formatting of the items of data 27 discussed above, whereby a particular subset of the data source is evaluated, rather than the entire data source.

Specific examples will help demonstrate the importance of the two criteria. Referring again to the specific example depicted in FIG. 3, identifying related items of data 27 of the data sources 31, 33 based upon the generated scores comprises linking a data item of the Jones movie data source with a data item of the Smith movie data source when a total match score for the data items is greater than any total match score for the data item of the Jones movie data source and any other data item of the Smith movie data source and the total match score for the data items is greater than a threshold matching criterion. In particular, the first three rows of the table of FIG. 3 disclose the total match score for each data set including the first data item of the Jones movie data source 31. The first criterion requires comparing the scores of each of these sets to see which score is the largest. In this case, the score of 10,995 for the data set comprising the first data item of the Jones movie data source 31 and the first data item of the Smith movie data source 33 is clearly larger than the 5,905 score for the data set comprising the first data item of the Jones movie data source and the second data item of the Smith movie data source and the 80 score for the data set comprising the first data item of the Jones movie data source and the third data item of the Smith movie data source. The second criterion requires that the total match score be greater than a particular threshold matching criterion, such as 8,500 for this particular algorithm. Because the score of 10,995 for the data set comprising the first data item of the Jones movie data source 31 and the first data item of the Smith movie data source 33 surpasses the threshold matching criterion of 8,500, the scoring algorithm will deem the data set comprising the first data item of the Jones movie data source and the first data item of the Smith movie data source as a match, as indicated in the final column of the table of FIG. 3. This result is as intended, as the first data item 27 of both data sources 31, 33 is the movie "The 20th Century with Mike Wallace: Ourselves, Our Bodies."

Similarly, the next three rows of the table of FIG. 3 disclose the total match score for each data set including the second data item of the Jones movie data source 31. The first criterion requires comparing the scores of each of these sets to see which score is the largest. In this case, the score of 10,375 for the data set comprising the second data item of the Jones movie data source 31 and the third data item of the Smith movie data source 33 is clearly larger than the 80 score for the data set comprising the second data item of the Jones movie data source and the first data item of the Smith movie data source and the 80 score for the data set comprising the second data item of the Jones movie data source and the second data item of the Smith movie data source. The second criterion requires that the total match score be greater than a particular threshold matching criterion, such as the 8,500 threshold introduced above. Because the score of 10,375 for the data set comprising the second data item of the Jones movie data source and the third data item of the Smith movie data source surpasses the threshold matching criterion of 8,500, the scoring algorithm will deem the data set comprising the second data item of the Jones movie data source and the third data item of the Smith movie data source as a match, as indicated in the final column of the table of FIG. 3. This result is also as intended, as the second data item of the Jones movie data source and the third data item of the Smith movie data source is the movie "Dial M for Murder."

Finally, the last three rows of the table of FIG. 3 disclose the total match score for each data set including the third data item of the Jones movie data source 31. Applying the first criterion, the score of 7,050 for the data set comprising the third data item of the Jones movie data source and the third data item of the Smith movie data source 33 is clearly larger than the 80 score for the data set comprising the third data item of the Jones movie data source and the first data item of the Smith movie data source and the 80 score for the data set comprising the third data item of the Jones movie data source and the second data item of the Smith movie data source. The second criterion requires that the total match score be greater than a particular threshold matching criterion, such as the 8,500 threshold introduced above. Unlike the previous examples, the score of 7,050 for the data set comprising the third data item of the Jones movie data source and the third data item of the Smith movie data source is less than the threshold matching criterion of 8,500, such that the scoring algorithm will not deem any data set as indicative of a match, as indicated in the final column of the table of FIG. 3. This result is also as intended, as the third data item of the Jones movie data source, the movie "Murder!", does not match any of the data items of the Smith movie data source. The data items 27 share the word "Murder" in their titles, as well as an MPAA rating, and have run lengths differing by only 8 minutes, but the threshold matching criterion is set at a high enough level to correctly exclude the potential match.

As would be readily understood by one skilled in the art, the identifying related items of data 27 may identify related items based upon the generated scores when more than two data sources are interlinked, such as items of data of the first, second, and a third data source. In particular, with third data source, the identifying related items of data 27 comprises linking a data item of the first data source 21 with a data item of the second data source 23 when a total match score for the data items is greater than any total match score for the data item of the first data source and any other data item of the second data source and the total match score for the data items of the first and second data sources is greater than a threshold matching criterion. In addition, the identifying related items of data 27 comprises linking the data item of the first data source 21 with a data item of the third data source when a total match score for the data items is greater than any total match score for the data item of the first data source and any other data item of the third data source and the total match score for the data items of the first and third data sources is greater than a threshold matching criterion.

Once any matches between data items 27 have been identified, the method may further comprise providing a link between data items of the first data source 21 and data items of the second data source 23 identified as being related. Providing such a link may be in response to receiving an item selection from a user. Such a link may be made accessible via at least one of a web browser, a media player, a handheld electronic device, or a personal computer, among others.

Interlinking of multiple data sources 21, 23, can occur in any number of ways. In the standard, or simple, interlinking model, a total match score is calculated for every possible set of data items 27 from any two data sources 21, 23. Each set of data items 27 is considered a potential match candidate. The executing a scoring algorithm process described above is performed on every potential set of data items 27 across every potential pairing of data sources 21, 23, generating a score for each set of data items comprising an item of data from the first data source and an item of data from the second data source. Executing a scoring algorithm for each of these sets can require a large processing capacity. Consider a relatively simple example including three data sources, each having two data items, A and B, C and D, and E and F, respectively. To interlink each of these three data sources to one another using the simple interlinking model, a total of 24 sets of data would need to be evaluated as potential matches, according to the following calculation:

2 data items in the first data source×
    2 data items in the second data source×
    2 data items in the third data source×
    3 total data sources=24 sets, including the combinations of AC, AD, AE, AF, BC, BD, BE, BF, CA, CB, CE, CF, DA, DB, DE, DF, EA, EB, EC, ED, FA, FB, FC, and FD. This simple interlinking model reviews each potential set of data items, even those that are redundant, such as AE and EA. Simple interlinking is appropriate in those applications where the computational processing available can readily handle the sometimes large number of individual sets produced by the interlinking, but may be less appropriate where the number of data items is very large and processing capacity is limited.

Because the unoptimized, or standard, interlinking, model can potentially produce an exponential number of match operations due to a large number of data items 27 in one or more data sources 21, 23, optimizations to minimize processing are valuable tools. One of these optimizations is to only perform match calculations on sets of data items 27 that are preliminarily identified as potential best match pairs. Such an optimization selects one or two high-cardinality attributes 29 and executes a preliminary match calculations on all possible sets of data items 27. High-cardinality attributes 29 are those attributes that include many different potential values, such that differentiation among data items 27 is relatively high. The optimization excludes all match candidate sets of data items 27 that return zero scores for all the selected high-cardinality attributes 29, such that the group of remaining sets of data items is of a smaller, more manageable, size. Such an optimization may reduce the total number of potentially related sets of data items 27 by ninety percent or more when compared with all the possible sets of the unoptimized, or standard, interlinking model. Once the number of sets of data items 27 is reduced be excluding those clearly non-related sets, the full execution of the scoring algorithm may be processed on the remaining sets of data items.

In particular, the executing of the method comprises executing a preliminary matching algorithm for one or two high-cardinality attributes 29 to generate a preliminary score for sets of data items 27 comprising an item of data from the first data source 21 and an item of data from the second data source 23. The method then identifies clearly unrelated sets of data items 27 of the first and second data sources 21,23 based upon the generated preliminary scores and excludes the clearly unrelated sets of data from the process of executing the scoring algorithm. The preliminary matching algorithm acts as a filter for excluding those sets of data items 27 that are clearly unrelated to one another so that those sets need not be further screened.

In addition to determining what sets are clearly non-related and excluding those sets from the calculation by utilizing high-cardinality attributes 29, another optimization useful in limiting processing is serial interlinking. Serial interlinking is particularly appropriate when considering the association of data items 27 between many data sources, such as more than three sources. Rather than interlinking every data source to every other data source and performing potentially redundant calculations, an interlinking chain can be formed by interlinking a data source that has not been previously interlinked to a data source that has been. Specifically, executing the scoring algorithm of the method comprises generating a score for each set of data comprising an item of data from the first data source, and an item of data from the second data source, and generating a score for each set of data comprising an item of data from the second data source and an item of data from the third data source. With serial interlinking, the executing generates a score between the first and second data sources, and the second and third data sources, but does not require generating a score for each set of data comprising an item of data from the first data source and an item of data from the third data source.

Consider a relatively simple example including four data sources, each having one hundred data items. To interlink each of these four data sources to one another using the simple interlinking model, a total of 120,000 sets of data would need to be evaluated as potential matches, many of them duplicates, according to the following calculation:

100 data items in one data source×
    100 data items in another data source×
    3 interlinking associations per data source×
    4 total data sources=120,000 sets.

Considering the same example with serial interlinking, however, the first data source is interlinked with the second data source, the third data source with the second data source, and the fourth data source with the third data source, yielding a total of 30,000 sets of data to be evaluated, according to the following calculation:

100 data items in one data source×
    100 data items in another data source×
    3 interlinking associations in total=30,000 sets.

By interlinking a data source that has not been interlinked to a data source that has been interlinked, the newly interlinked data source can be considered interlinked to every other interlinked data source, thereby forming an interlinked chain. In the example noted above, when the third data source is interlinked with the second data source, it is also interlinked with the first data source, which has already been interlinked with the second data source.

There are limitations to the serial interlinking model. An incorrect interlink between two data sources can be propagated by following the interlink chain, thereby propagating the error. Also, interlink candidate sets of data items may be missed if data sources being interlinked have different data coverage. This particular limitation can be mitigated by specifying the interlink order. Thus, for a large number of data sources with similar data coverage, the error/loss from serial interlinking may be small and acceptable.

In addition to excluding clearly non-related sets of data items from the calculation and serial interlinking, another optimization useful in limiting processing is trunk interlinking. With trunk interlinking, one data source is selected as the trunk data source and all other data sources are interlinked to it. Trunk interlinking has the same performance benefits as serial interlinking, discussed above. Trunk interlinking is particularly useful where the trunk data source has broad coverage, or many data items, such that few potential data set matches may be missed. In one example, the executing of the present method comprises generating a score for each set of data comprising an item of data from the first data source and an item of data from the second data source, and generating a score for each set of data comprising an item of data from the first data source and an item of data from the third data source. In this example, the first data source is considered the trunk data source. In another example, the first data source comprises a canonical source, having a substantially cumulative listing of most data items.

Returning to the details of the scoring algorithm, the execution of the scoring algorithm is designed to utilize relatively simple comparator operations. An individual scoring algorithm need not provide a high degree of differentiation on its own, but due to the number of scoring operations that are needed, the operation must be computationally quick. Another requirement of the scoring algorithm is that they be symmetrical. That is, the algorithm should return the same value regardless of the order in which values are passed. This simplifies the resultant matches and prevents circular match paths in a particular pair of data sources.

In one example, the scoring algorithm assigns a particular score to each string comparison based upon the following criteria. For the example comparison between the first and second strings (FIG. 1), the method assigns a high score when the string comparison yields an exact match. The method instead assigns a neutral score less than the high score when at least one of the first string and the second string contains no value. The method further assigns a low score less than the neutral score when the string comparison between the first string and the second string yields a partial match. Finally, the method assigns a zero score when none of the high score, the neutral score, and the low score is assigned.

In another example, the results of which are depicted in FIG. 3, a slightly more sophisticated scoring algorithm is utilized. The first attribute forming part of the execution step is the Title or Movie Name attribute. Generally speaking, to generate a score indicative of the similarity of Title or Movie Name attributes 29 of a given set of data items 27, the average percentage of shared words between the data strings is calculated. To facilitate this comparison, the data associated with the Title or Movie Name attribute 29 is split into individual words. During this operation, any punctuation characters are removed and text translations may also be made.

Once the strings are split into words, the algorithm's first step requires finding shared words between the data items. Each occurrence of a particular shared word is counted only once. For example, in comparing the first data item of the Jones movie data source 31 and the second data item of the Smith movie data source 33, six words are shared, namely: "The", "20th", "Century", "with", "Mike", and "Wallace."

After the shared words are determined, common words may be excluded. Common words to be excluded may be readily determined at execution time by selecting the top five most common words from all the movie titles. In a small set of data items 27, or movies, this exclusion of common words may inadvertently exclude useful words. Therefore, in another example, an exclusion list of common words may be determined beforehand, independent of the data items 27, to avoid this. For this example, assume that the common words "The", "and", and "With" are excluded. Because "The" and "With" are each shared words, the number of shared words between the data items drops from six to four.

With the shared words determined, the percentage of words in each title that match may be calculated. For the first data item of the Jones movie data source 31, seven words are counted in the title, namely: "20th", "Century", "Mike", "Wallace", "Ourselves", "Our", and "Bodies", while "The" and "with" are excluded as common. Thus the percentage of common words for the first data item of the Jones movie data source 31 is 4/7 or 57.1%. For the second data item of the Smith movie data source 33, nine words are counted in the title, namely: "20th", "Century", "Mike", "Wallace", "Feminist", "Movement", "Battle", "Over", and "Abortion", while "The", "and", and "with" are excluded as common. Thus the percentage of common words for the second data item of the Smith movie data source is 4/9 or 44.4%.

Once the percentage of common words in each data item is calculated, the average of the percentages may be calculated as (4/7+4/9)/2, or 50.8%, which may be rounded to the nearest whole integer to yield a final score of 51, as depicted in the table of FIG. 3. The other scores in the "Title and Movie Name Score" column of the table are calculated similarly. The generalized calculation is set forth below for reference, along with the detailed calculation for the first data item of the Jones movie data source 31 and the second data item of the Smith movie data source 33:

Calculation:

$w_4$ = {The with 20th Century Mike Wallace Ourselves Our Bodies}

$w_5$ = {The with and 20th Century Mike Wallace Feminist Movement Battle Over Abortion}

$CW_{ex}$ = {The With And}

$cw_{4-5} = w_4 \cap w_5 - CW_{ex}$ = {20th Century Mike Wallace}

$N(S)$ = number of elements in a set $score_{name} =$ $$\frac{N(cw_{4-5})/N(w_4 - CW_{ex}) + N(cw_{4-5})/N(w_5 - CW_{ex})}{2} \times 100 =$$

$$\frac{4/7 + 4/9}{2} \times 100 = 51$$

The other scores in the "MPAA Rating Score" column of the table are calculated similarly. Although the present example utilizes the number of matching words to facilitate scoring, it is also contemplated that the number of matching characters, or character strings, could be utilized without departing from the scope of the claimed invention.

Next, the score for the MPAA rating comparison may be assigned based upon the following criteria:

| Rule | Score |
| --- | --- |
| Both data items have identical, non-null MPAA ratings. | 5 (high) |
| Either or both of the data items has an empty or null MPAA rating. | 2 (neutral) |
| Both movies have dissimilar, non-null MPAA ratings. | 0 |

Thus, in comparing the first data item of the Jones movie data source 31 and the second data item of the Smith movie data source 33, both data items have a "null" MPAA rating, yielding a score of 2. Comparing the third data item of the Jones movie data source 31, an item with a "Not rated" rating, and the third data item of the Smith movie data source 33, an item with a "Not rated" rating, however, yields a score of 5. The other scores in the "MPAA Rating Score" column of the table are calculated similarly.

Executing the scoring algorithm next comprises comparing the run length of each movie to assign a score based on the similarity of the run length of the data items 27. The goal of this portion of the algorithm is to sharply decrease the score as run lengths diverge. The algorithm assigns a score of 5 for perfect matches. For imperfect matches, a quickly degrading formula is utilized to calculate the score, dropping one score point for each mismatch and one more score point for every 5 minutes difference between the data items 27. The generalized equations are set forth below, as well as the calculation for the first data item of the Jones movie data source 31 and the second data item of the Smith movie data source 33.

Calculation $l_4$ = length of the first data item $l_5$ = length of the second data item if($l_4 = l_5$) → $score_{length} = 5$ else → $score_{length} =$ $$4 - \text{round}\left(\frac{abs(l_4 - l_5)}{5}\right) = 4 - \text{round}\left(\frac{abs(50 - 47)}{5}\right) = 3$$

The other scores in the "Run Length Score" column of the table are calculated similarly.

In addition, executing the scoring algorithm comprises comparing the release date of each movie to assign a score based upon the similarity of the release date of the data items 27. As with run length, the algorithm for release date ideally decreases sharply as dates diverge. This calculation is complicated because some data items 27 include partial dates, while others include detailed dates. For example, one data item 27 may include only the year, while another may include the year, month, and day of release. The table below shows the calculation for each case and the functions assigned to each table of the case. The one exception to the table below is that when the dates exactly match one another (i.e., $d_a$ (first date) =$d_b$ (second date)), an automatic score of 5 is assigned. The release date score has a limited range from 0 to 5, so that if the calculation yields a result greater than five, a score of five is returned. Similarly, a negative score will result in a zero score.

|  | $d_a$ is null | $d_a$ has yy | $d_a$ has yy/mm | $d_a$ has yy/mm/dd |
|---|---|---|---|---|
| $d_b$ is null | $score_{date} = 2$ | $score_{date} = 0$ | $score_{date} = 0$ | $score_{date} = 0$ |
| $d_b$ has yy | $score_{date} = 0$ | $score_{date} = f(d_a, d_b)$ | $score_{date} = f(d_a, d_b)$ | $score_{date} = f(d_a, d_b)$ |
| $d_b$ has yy/mm | $score_{date} = 0$ | $score_{date} = f(d_a, d_b)$ | $score_{date} = f(d_a, d_b) + g(d_a, d_b)$ | $score_{date} = f(d_a, d_b)$ |
| $d_b$ has yy/mm/dd | $score_{date} = 0$ | $score_{date} = f(d_a, d_b)$ | $score_{date} = f(d_a, d_b)$ | $score_{date} = f(d_a, d_b) + g(d_a, d_b) + h(d_a, d_b)$ |

Functions $$f(d_a, d_b) = 5 - 2^{abs(year(d_a) - year(d_b))}$$

$$g(d_a, d_b) = \left\lceil \frac{2 - abs(month(d_a) - month(d_b))}{2} \right\rceil$$

$$h(d_a, d_b) = \left\lceil \frac{5 - abs(day(d_a) - day(d_b))}{5} \right\rceil$$

The other scores in the "Release Date Score" column of the table are calculated similarly.

For the first data item of the Jones movie data source 31 and the second data item of the Smith movie data source 33, both data items 27 have an identical release date of "1996-01-01 01:01:00", yielding an automatic score of 5. In contrast, the third data item of the Jones movie data source 31 has a release year of 1930, and the third data item of the Smith movie data source 33 has a release year of 1954, yielding a score of 0, according to the following function:

$$f(d_a, d_b) = 5 - 2^{1930-1954} = 5 - 2^{24} = -1.6E7 \rightarrow 0$$

Once scores for each of the attributes are calculated, executing the scoring algorithm process continues with weighting each of the attribute scores according to their relative importance in identifying related data items 27, as discussed above. The weighting fine tunes the model based upon the score calculations and the type of data contained in each attribute 29. For the exemplary data of FIG. 3, the following weights were utilized:

| Field | Weight |
|---|---|
| Name | 100 |
| MPAA Rating | 40 |
| Run Length | 75 |
| Release Date | 100 |

Taking the scores for the first data item of the Jones movie data source 31 and the second data item of the Smith movie data source 33 derived above, the total match score may be calculated as follows:

Calculation $$score_{total} = \sum_i w_i \cdot score_i$$
$$= (w_{name} \cdot score_{name}) + (w_{mpaa} \cdot score_{mpaa}) +$$
$$(w_{length} \cdot score_{length}) + (w_{date} \cdot score_{date})$$
$$= (100 \cdot 51) + (40 \cdot 2) + (75 \cdot 3) + (100 \cdot 5) = 5905$$

Other algorithms are also contemplated as within the scope of the claimed invention. Various scoring schemes may be utilized without departing from the scope of the claimed invention.

In another embodiment depicted in FIG. 4, the present invention may comprise one or more computer-readable media (CRM), generally indicated 51, having computer-executable components for linking related data from at least two sources of data. The components comprise an attribute component for formatting items of data of a first data source according to a plurality of predetermined attributes. The attribute component further formats items of data of a second data source according to the attributes. An engine component executes a scoring algorithm for one or more of the attributes for generating a score for sets of data, the sets of data each comprising an item of data of the first data source formatted by the attribute component and an item of data from the second data source formatted by the attribute component. A filter component identifies related items of data formatted by the attribute component based upon the scores generated by the engine component. The one or more computer-readable media may further comprise an aggregation component for generating a total match score for each set of data comprising an item of data from the first data source and an item of data from the second data source by combining the scores for each of the attributes generated by the engine component for each of the sets. In addition, the filter component links a data item of the first data source formatted by the attribute component with a data item of the second data source formatted by the attribute component when the total match score generated by the aggregation component for the data items is greater than any total match score for the data item of the first data source and any other data item of the second data source and the total match score for the data items is greater than a threshold matching criterion.

Figure 5:
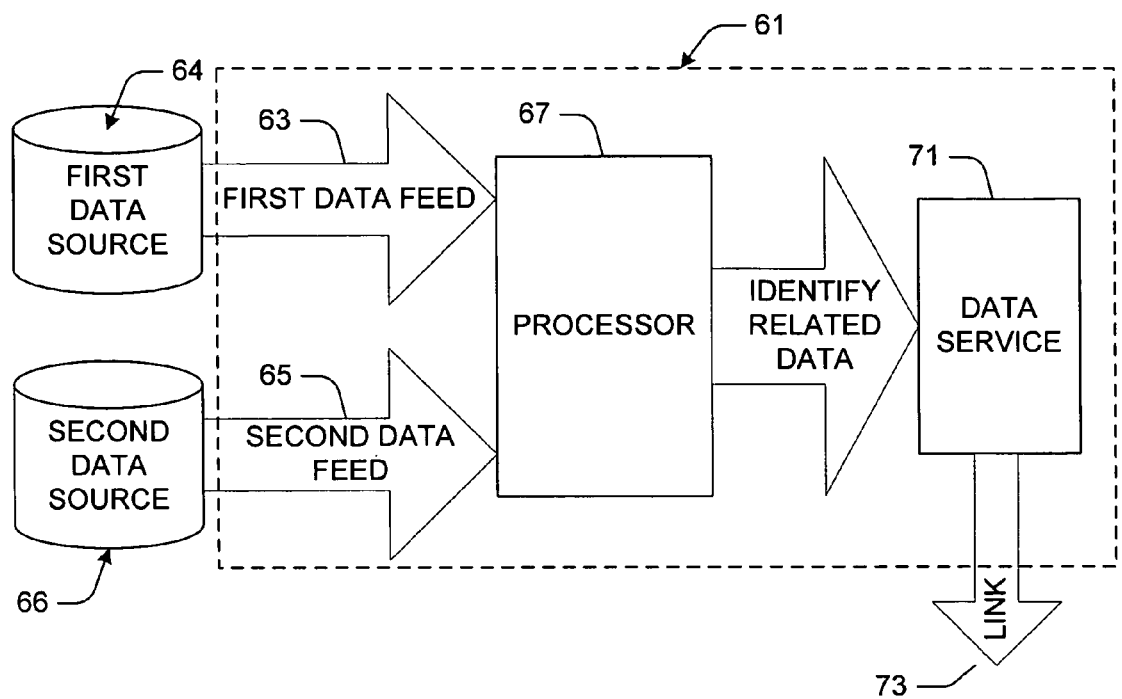
FIG. 5 is a diagram of a system of the present invention.

In another embodiment depicted in FIG. 5, a system, generally indicated 61, for linking related data from at least two sources of data comprises a first data feed 63 from a first data source 64, a second data feed 65 from a second data source 66, and a processor 67 for receiving information from the first and second data feeds. The processor 67 is configured to format items of data of the first data feed 63 according to attributes and format items of data of the second data feed 65 according to the attributes. The processor 67 is further configured to execute a scoring algorithm for one or more of the attributes to generate a score for one or more sets of the formatted items of data. Each of the sets comprises an item of data from the first data feed 63 and an item of data from the second data feed 65. The processor 67 is also configured to identify related items of data of the first and second data feeds 63, 65 based upon the generated scores. The system 61 may further comprise a data service 71 for providing a data link 73 between a data item of the first data feed 63 and a data item of the second data feed 65 identified as being related. In one example of the system 61, the data service 71 is a web service. The data service 71 provides a data link 73 between a data item of the first data feed 63 and a data item of the second data feed 65 when a total match score for the data items is greater than any total match score for the data item of the first data feed, and any other data item of the second data feed, and the total match score for the data items is greater than a threshold matching criterion.

In still another embodiment, a method is disclosed for establishing a link between related metadata from at least two sources of metadata. The metadata includes property data associated with a media file accessible by a client. The method comprises formatting items of data of a first metadata source 21 according to attributes 29 and formatting items of data of a second metadata source 23 according to the attributes. The method further comprises executing a scoring algorithm for one or more of the attributes 29 to generate a score for one or more sets of the formatted items of data 27, each of the sets comprising an item of data from the first data source 21 and an item of data from the second data source 23. The method further comprises identifying related items of data 27 of the first and second data sources 21, 23 based upon the generated scores and establishing at least one link 73 between data items of the first metadata source related to data items of the second metadata source identified as being related. The method also generates a user interface, such as the monitor 188 discussed below, displaying the established link. In another example, the method may further comprise determining that a media file associated with an item of data 27 located in one of the metadata sources is accessed by the client and presenting a link 73 associated with the item of data to the client.

Figure 6:
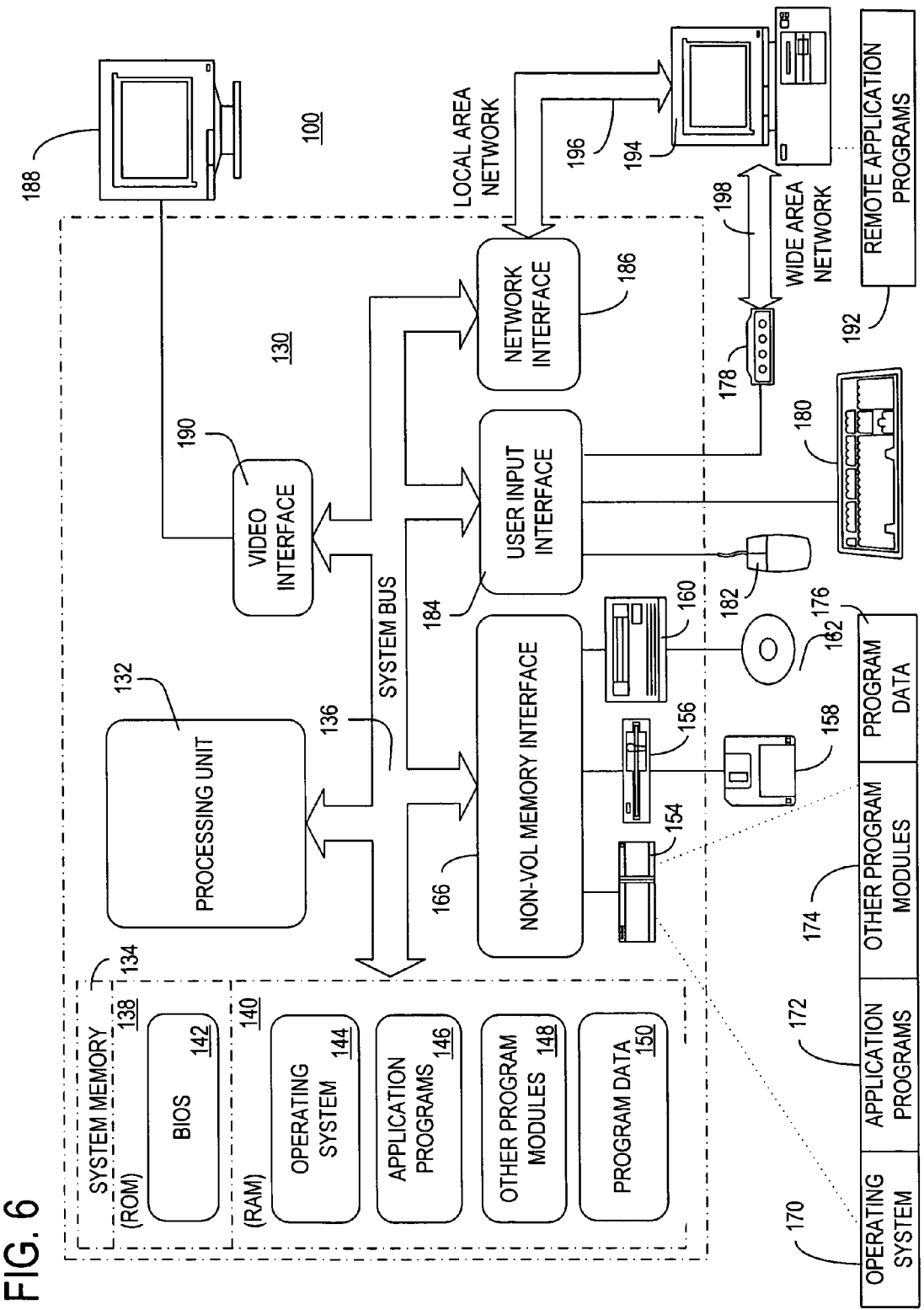
FIG. 6 is a block diagram illustrating one example of a suitable computing system environment in which the invention may be implemented.

FIG. 6 shows one example of a general purpose computing device in the form of a computer 130. In one embodiment of the invention, a computer such as the computer 130 is suitable for use in the other figures illustrated and described herein. For example, processor 67 and/or data service 71 may be embodied by computer 130. Computer 130 has one or more processors or processing units 132 and a system memory 134. In the illustrated embodiment, a system bus 136 couples various system components including the system memory 134 to the processors 132. The bus 136 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus also known as Mezzanine bus.

The computer 130 typically has at least some form of computer readable media. Computer readable media, which include both volatile and nonvolatile media, removable and non-removable media, may be any available medium that can be accessed by computer 130. By way of example and not limitation, computer readable media comprise computer storage media and communication media. Computer storage media include volatile and nonvolatile, removable and non-removable media implemented in any method or technology for storage of information such as computer readable instructions, data structures, program modules or other data. For example, computer storage media include RAM, ROM, FEPROM, flash memory or other memory, CD-ROM, digital versatile disks (DVD) or other optical disk storage, magnetic cassettes, magnetic tape, magnetic disk storage or other magnetic storage devices, or any other storage medium that can be used to store the desired information and that can be accessed by computer 130. Communication media typically embody computer readable instructions, data structures, program modules, or other data in a modulated data signal such as a carrier wave or other transport mechanism and include any information delivery media. Those skilled in the art are familiar with the modulated data signal, which has one or more of its characteristics set or changed in such a manner as to encode information in the signal. Wired media, such as a wired network or direct-wired connection, and wireless media, such as acoustic, RF, infrared, and other wireless media, are examples of communication media. Combinations of the any of the above are also included within the scope of computer readable media.

The system memory 134 includes computer storage media in the form of removable and/or non-removable, volatile and/or nonvolatile memory. In the illustrated embodiment, system memory 134 includes read only memory (ROM) 138 and random access memory (RAM) 140. A basic input/output system 142 (BIOS), containing the basic routines that help to transfer information between elements within computer 130, such as during start-up, is typically stored in ROM 138. RAM 140 typically contains data and/or program modules that are immediately accessible to and/or presently being operated on by processing unit 132. By way of example, and not limitation, FIG. 6 illustrates operating system 144, application programs 146, other program modules 148, and program data 150.

The computer 130 may also include other removable/non-removable, volatile/nonvolatile computer storage media. For example, FIG. 6 illustrates a hard disk drive 154 that reads from or writes to non-removable, nonvolatile magnetic media. FIG. 6 also shows a magnetic disk drive 156 that reads from or writes to a removable, nonvolatile magnetic disk 158, and an optical disk drive 160 that reads from or writes to a removable, nonvolatile optical disk 162 such as a CD-ROM or other optical storage media. Other removable/non-removable, volatile/nonvolatile computer storage media that can be used in the exemplary operating environment include, but are not limited to, magnetic tape cassettes, flash memory cards, digital versatile disks, digital video tape, solid state RAM, and solid state ROM. The hard disk drive 154, and magnetic disk drive 156 and optical disk drive 160 are typically connected to the system bus 136 by a non-volatile memory interface, such as interface 166.

The drives or other mass storage devices and their associated computer storage media discussed above and illustrated in FIG. 6, provide storage of computer readable instructions, data structures, program modules and other data for the computer 130. In FIG. 6, for example, hard disk drive 154 is illustrated as storing operating system 170, application programs 172, other program modules 174, and program data 176. Note that these components can either be the same as or different from operating system 144, application programs 146, other program modules 148, and program data 150. Operating system 170, application programs 172, other program modules 174, and program data 176 are given different numbers here to illustrate that, at a minimum, they are different copies.

A user may enter commands and information into computer 130 through input devices or user interface selection devices such as a keyboard 180 and a pointing device 182 (e.g., a mouse, trackball, pen, or touch pad). Other input devices (not shown) may include a microphone, joystick, game pad, camera, scanner, or the like. These and other input devices are connected to processing unit 132 through a user input interface 184 that is coupled to system bus 136, but may be connected by other interface and bus structures, such as a parallel port, game port, or a Universal Serial Bus (USB). A monitor 188 or other type of display device is also connected to system bus 136 via an interface, such as a video interface 190. In addition to the monitor 188, computers often include other peripheral output devices (not shown) such as a printer and speakers, which may be connected through an output peripheral interface (not shown).

The computer 130 may operate in a networked environment using logical connections to one or more remote computers, such as a remote computer 194. The remote computer 194 may be a personal computer, a server, a router, a network PC, a peer device or other common network node, and typically includes many or all of the elements described above relative to computer 130. The logical connections depicted in FIG. 6 include a local area network (LAN) 196 and a wide area network (WAN) 198, but may also include other networks. LAN 136 and/or WAN 138 can be a wired network, a wireless network, a combination thereof, and so on. Such networking environments are commonplace in offices, enterprise-wide computer networks, intranets, and global computer networks (e.g., the Internet).

When used in a local area networking environment, computer 130 is connected to the LAN 196 through a network interface or adapter 186. When used in a wide area networking environment, computer 130 typically includes a modem 178 or other means for establishing communications over the WAN 198, such as the Internet. The modem 178, which may be internal or external, is connected to system bus 136 via the user input interface 184, or other appropriate mechanism. In a networked environment, program modules depicted relative to computer 130, or portions thereof, may be stored in a remote memory storage device (not shown). By way of example, and not limitation, FIG. 6 illustrates remote application programs 192 as residing on the memory device. It will be appreciated that the network connections shown are exemplary and other means of establishing a communications link between the computers may be used.

Generally, the data processors of computer 130 are programmed by means of instructions stored at different times in the various computer-readable storage media of the computer. Programs and operating systems are typically distributed, for example, on floppy disks or CD-ROMs. From there, they are installed or loaded into the secondary memory of a computer. At execution, they are loaded at least partially into the computer's primary electronic memory. The invention described herein includes these and other various types of computer-readable storage media when such media contain instructions or programs for implementing the operations described below in conjunction with a microprocessor or other data processor.

For purposes of illustration, programs and other executable program components, such as the operating system, are illustrated herein as discrete blocks. It is recognized, however, that such programs and components reside at various times in different storage components of the computer, and are executed by the data processor(s) of the computer.

Although described in connection with an exemplary computing system environment, including computer 130, the invention is operational with numerous other general purpose or special purpose computing system environments or configurations. The computing system environment is not intended to suggest any limitation as to the scope of use or functionality of the invention. Moreover, the computing system environment should not be interpreted as having any dependency or requirement relating to any one or combination of components illustrated in the exemplary operating environment. Examples of well known computing systems, environments, and/or configurations that may be suitable for use with the invention include, but are not limited to, personal computers, server computers, hand-held or laptop devices, multiprocessor systems, microprocessor-based systems, set top boxes, programmable consumer electronics, mobile telephones, network PCs, minicomputers, mainframe computers, distributed computing environments that include any of the above systems or devices, and the like.

Those skilled in the art will note that the order of execution or performance of the methods illustrated and described herein is not essential, unless otherwise specified. That is, it is contemplated by the inventors that elements of the methods may be performed in any order, unless otherwise specified, and that the methods may include more or less elements than those disclosed herein.

When introducing elements of the present invention or the embodiment(s) thereof, the articles "a," "an," "the," and "said" are intended to mean that there are one or more of the elements. The terms "comprising," "including," and "having" are intended to be inclusive and mean that there may be additional elements other than the listed elements.

In view of the above, it will be seen that the several objects of the invention are achieved and other advantageous results attained.

As various changes could be made in the above products and methods without departing from the scope of the invention, it is intended that all matter contained in the above description and shown in the accompanying drawings shall be interpreted as illustrative and not in a limiting sense.

What is claimed is:

1. A method for linking related data from at least two data sources, said method comprising:

formatting data items of a first data source, each of said data items of the first data source including a plurality of attributes, wherein each of said data items of the first data source is formatted according to the attributes included therewith;

formatting data items of a second data source, each of said data items of the second data source including a plurality of attributes, wherein each of said data items of the second data source is formatted according to the attributes included therewith, and wherein a first attribute included in a first data item of the first data source comprises a first string and a corresponding first attribute of a first data item of the second data source comprises a second string, a second attribute included in the first data item of the first data source comprises a third string and a corresponding second attribute of the first data item of the second data source comprises a fourth string, the first attribute of a second data item of the second data source comprises a fifth string, and the second attribute of the second data item of the second data source comprises a sixth string;

selecting one or more high-cardinality attributes from the plurality of attributes included in the data items of the first data source and the attributes included in the data items of the second data source;

executing, by a computing device, a preliminary matching algorithm for the selected high-cardinality attributes to generate a preliminary score for each set of a group of data item sets, said each set comprising a formatted data item from the first data source and a formatted data item from the second data source;

identifying sets which have unrelated data items of the first and second data sources based upon the generated preliminary scores;

modifying the group of data item sets to exclude said sets identified as having unrelated data items;

executing, by the computing device, a scoring algorithm for each data item set in the modified group of data item sets, wherein executing the scoring algorithm for the first attributes comprises performing a string comparison between the first string and the fifth string and executing the scoring algorithm for the second attributes comprises performing a string comparison between the third string and the sixth string, and wherein executing the scoring algorithm further comprises combining a score from the string comparison between the first string and the fifth string and from the string comparison between the third string and the sixth string to produce a total match score for the first data item of the first data source and the second data item of the second data source;

identifying sets which have related data items of the first and second data sources based upon the total match scores;

linking the first data item of the first data source with the first data item of the second data source when the total match score for the first data items of each of the first and second data sources is greater than the total match score for the first and second data items of the first and second data sources, respectively, and the total match score for the first data items is greater than a threshold matching criterion; and linking the first data item of the first data source with the second data item of the second data source when the total match score for the first and second data items of the first and second data sources, respectively, is greater than the total match score for first data items of each of the first and second data sources and the total match score for the first and second data items of the first and second data sources, respectively, is greater than a threshold matching criterion.

2. The method as set forth in claim 1 further comprising providing a link between data items of the first data source and data items of the second data source identified as being related.

3. The method as set forth in claim 2 wherein said providing a link is in response to receiving an item selection from a user.

4. The method as set forth in claim 2 wherein said link is accessible via at least one of a web browser, a media player, a handheld electronic device, or a personal computer.

5. The method as set forth in claim 1
wherein said executing the scoring algorithm for said first attributes comprises performing a string comparison between the first string and the second string and scoring the comparison of the first attribute of the first data item of the first data source and the corresponding first attribute of the first data item of the second data source according to said scoring algorithm.

6. The method as set forth in claim 5
wherein said executing the scoring algorithm for said second attributes comprises performing a string comparison between the third string and the fourth string and scoring the comparison of the second attribute of the first data item of the first data source and the corresponding second attribute of the first data item of the second data source according to said scoring algorithm.

7. The method as set forth in claim 6 wherein said executing the scoring algorithm further comprises combining the score from the string comparison between the first string and the second string and from the string comparison between the third string and the fourth string to produce a total match score for said first data items.

8. The method as set forth in claim 7 wherein said executing the scoring algorithm further comprises
weighting the score for said first attribute of the first data items before said combining, and
weighting the score for said second attribute of the first data items before said combining.

9. The method as set forth in claim 7
wherein executing the scoring algorithm for said first attributes further comprises scoring the comparison of the first attribute of the first data item of the first data source and a corresponding first attribute of the second data item of the second data source according to said scoring algorithm.

10. The method as set forth in claim 9
wherein executing the scoring algorithm for said second attributes further comprises scoring the comparison of the second attribute of the first data item of the first data source and a corresponding second attribute of the second data item of the second data source according to said scoring algorithm.

11. The method as set forth in claim 5 wherein said scoring the comparison comprises,
assigning a high score when the string comparison between the first string and the second string yields an exact match,
assigning a neutral score less than said high score when at least one of said first string and said second string contains no value,
assigning a low score less than said neutral score when the string comparison between the first string and the second string yields a partial match, and
assigning a zero score when none of the high score, the neutral score, and the low score is assigned.

12. The method as set forth in claim 1 wherein said executing the scoring algorithm further comprises
weighting the score for said first attribute of the first and second data items of the first and second data sources, respectively, before said combining, and weighting the score for said second attribute of the first and second data items of the first and second data sources, respectively, before said combining.

13. The method as set forth in claim 1 wherein said identifying sets which have related data items of the first and second data sources based upon the total match scores further comprises,
linking the first data item of the first data source with the first data item of the second data source when the total match score for the first data items is greater than the total match score for the first data item of the first data source and any other data item of the second data source and the total match score for the first data items is greater than a threshold matching criterion.

14. The method as set forth in claim 1 wherein said identifying sets which have related data items of the first and second data sources based upon the total match scores further comprises,
linking a data item of the first data source with a data item of the second data source when a total match score for said data items is greater than any total match score for the data item of the first data source and any other data item of the second data source and the total match score for said data items is greater than a threshold matching criterion.

15. The method as set forth in claim 1 wherein said executing comprises generating a score for each set of data items comprising an item of data from said first data source and an item of data from said second data source.

16. The method as set forth in claim 15 wherein said executing comprises aggregating said sets of data comprising an item of data from said first data source and an item of data from said second data source for at least two of said attributes to generate a total match score for each of said sets.

17. The method as set forth in claim 1 further comprising formatting items of data of a third data source according to said attributes;
wherein said executing further comprises executing a scoring algorithm for one or more of the attributes to generate a score for sets of data comprising an item of data from one of said data sources and an item of data from another of said data sources; and
wherein said identifying sets which have related data items further comprises identifying sets which have related data items of the first, second, and third data sources based upon the generated scores.

18. The method as set forth in claim 17 wherein said identifying sets which have related data items of the first and second data sources based upon the generated scores further comprises,
linking a data item of the first data source with a data item of the second data source when a total match score for said data items is greater than any total match score for the data item of the first data source and any other data item of the second data source and the total match score for said data items of the first and second data sources is greater than a threshold matching criterion, and
linking the data item of the first data source with a data item of the third data source when a total match score for said data items is greater than any total match score for the data item of the first data source and any other data item of the third data source and the total match score for said data items of the first and third data sources is greater than a threshold matching criterion.

19. The method as set forth in claim 17 wherein said executing comprises generating a score for each set of data comprising an item of data from said first data source and an item of data from said second data source, and
generating a score for each set of data comprising an item of data from said second data source and an item of data from said third data source.

20. The method as set forth in claim 17 wherein said executing comprises generating a score for each set of data comprising an item of data from said first data source and an item of data from said second data source, and
generating a score for each set of data comprising an item of data from said first data source and an item of data from said third data source.

21. The method as set forth in claim 20 wherein said first data source comprises a canonical source.

22. The method as set forth in claim 1 wherein said data sources comprise property data associated with media files.

23. The method as set forth in claim 1 wherein the data is data relating to at least one of video files, audio files, movies, music, executable files, and document files.

24. The method as set forth in claim 23 wherein when said data relates to movies said attributes are at least two of movie title, movie run time, Motion Picture Association of America (MPAA) rating, movie genre, releasing studio, cast listing, cast member, release date, release year, and director.

25. The method as set forth in claim 1 wherein said formatting comprises parsing items of data into data strings having a pre-defined format.

26. The method as set forth in claim 1 wherein said first and second data sources are at least one of a database file, an xml document, and a delimited text file.

27. The method of claim 1, further comprising serially interlinking the data sources by identifying related items of data of the first data source and the second data source and identifying related items of data of the second data source and a third data source thereby linking the first data source with the third data source.

28. One or more computer storage media having computer-executable components for linking related data from at least two sources of data, said components comprising:
an attribute component for formatting data items of a first data source and data items of a second data source, said data items from the first data source and said data items from the second data source each including a plurality of attributes, wherein said formatting includes formatting the data items of the first data source and the data items of the second data source according to attributes preselected from the plurality of attributes, wherein a first attribute included in a first data item of the first data source comprises a first string and a corresponding first attribute of a first data item of the second data source comprises a second string, a second attribute included in the first data item of the first data source comprises a third string and a corresponding second attribute of the first data item of the second data source comprises a fourth string, the first attribute of a second data item of the second data source comprises a fifth string, and the second attribute of the second data item of the second data source comprises a sixth string;
an engine component for:
selecting one or more high-cardinality attributes from the plurality of attributes included in the data items of the first data source and the attributes included in the data items of the second data source;
executing a preliminary matching algorithm for the selected high-cardinality attributes to generate a preliminary score for each set of a group of data item sets, said each set comprising a data item from the first data source formatted by the attribute component and a data item from the second data source formatted by the attribute component;

identifying sets which have unrelated data items of the first and second data sources based upon the generated preliminary scores;

modifying the group of data item sets to exclude said sets identified as having unrelated data items; and executing a scoring algorithm for each data item set in the modified group of data item sets, wherein executing the scoring algorithm for the first attributes comprises performing a string comparison between the first string and the fifth string and executing the scoring algorithm for the second attributes comprises performing a string comparison between the third string and the sixth string, and wherein executing the scoring algorithm further comprises combining a score from the string comparison between the first string and the fifth string and from the string comparison between the third string and the sixth string to produce a total match score for the first data item of the first data source and the second data item of the second data source;

linking the first data item of the first data source with the first data item of the second data source when the total match score for the first data items of each of the first and second data sources is greater than the total match score for the first and second data items of the first and second data sources, respectively, and the total match score for the first data items is greater than a threshold matching criterion;

linking the first data item of the first data source with the second data item of the second data source when the total match score for the first and second data items of the first and second data sources, respectively, is greater than the total match score for first data items of each of the first and second data sources and the total match score for the first and second data items of the first and second data sources, respectively, is greater than a threshold matching criterion; and a filter component for identifying sets which have related data items of the first and second data sources based upon the total match scores generated by the engine component.

29. The one or more computer storage media set forth in claim 28 further comprising an aggregation component for generating the total match score for each set of data items by combining said scores for each of said attributes generated by the engine component for each of said sets.

30. A system for linking related data from at least two sources of data, said system comprising:

a first data feed comprising a stream of data items, said data items of the first data feed including a plurality of attributes;

a second data feed comprising a stream of data items, said data items of the second data feed including a plurality of attributes, wherein a first attribute included in a first data item of the first data feed comprises a first string and a corresponding first attribute of a first data item of the second data feed comprises a second string, a second attribute included in the first data item of the first data feed comprises a third string and a corresponding second attribute of the first data item of the second data feed comprises a fourth string, the first attribute of a second data item of the second data feed comprises a fifth string, and the second attribute of the second data item of the second data feed comprises a sixth string; and a processor coupled to a memory, wherein the processor configured to:

receive said first and second data feeds, format data items of the first data feed according to one or more of the plurality of attributes included therewith, format data items of the second data feed according to one or more of the plurality of attributes included therewith, select one or more high-cardinality attributes from the plurality of attributes included in the data items of the first data source and the attributes included in the data items of the second data source;

execute a preliminary matching algorithm for the selected high-cardinality attributes to generate a preliminary score for each set of a group of data item sets, said each set comprising a formatted data item from the first data feed and a formatted data item from the second data feed;

identify sets which have unrelated data items of the first and second data feeds based upon the generated preliminary scores;

modify the group of data item sets to exclude said sets identified as having unrelated data items;

execute a scoring algorithm for each data item set in the modified group of data item sets, wherein executing the scoring algorithm for the first attributes comprises performing a string comparison between the first string and the fifth string and executing the scoring algorithm for the second attributes comprises performing a string comparison between the third string and the sixth string, and wherein executing the scoring algorithm further comprises combining a score from the string comparison between the first string and the fifth string and from the string comparison between the third string and the sixth string to produce a total match score for the first data item of the first data source and the second data item of the second data source;

link the first data item of the first data feed with the first data item of the second data feed when the total match score for the first data items of each of the first and second data feeds is greater than the total match score for the first and second data items of the first and second data feeds, respectively, and the total match score for the first data items is greater than a threshold matching criterion;

link the first data item of the first data feed with the second data item of the second data feed when the total match score for the first and second data items of the first and second data feeds, respectively, is greater than the total match score for first data items of each of the first and second data feeds and the total match score for the first and second data items of the first and second data feeds, respectively, is greater than a threshold matching criterion; and identify sets which have related data items of the first and second data feeds based upon the total match scores.

31. The system as set forth in claim 30 wherein said system comprises a data service for providing a data link between a data item of the first data feed and a data item of the second data feed identified as being related.

32. The system as set forth in claim 31 wherein said data service is a web service.

33. A method for establishing a link between related metadata from at least two sources of metadata, said metadata including property data associated with a media file accessible by a client, comprising:

formatting data items of a first metadata source, each of said data items of the first metadata source including a purality of attributes, wherein each of said data items of the first metadata source is formatted according to the attributes included therewith;

formatting data items of a second metadata source, each of said data items of the second metadata source including a plurality of attributes, wherein each of said data items of the second metadata source is formatted according to the attributes included therewith, wherein a first attribute included in a first data item of the first metadata source comprises a first string and a corresponding first attribute of a first data item of the second metadata source comprises a second string, a second attribute included in the first data item of the first metadata source comprises a third string and a corresponding second attribute of the first data item of the second metadata source comprises a fourth string, the first attribute of a second data item of the second metadata source comprises a fifth string, and the second attribute of the second data item of the second metadata source comprises a sixth string;

selecting one or more attributes from the plurality of attributes included in the data items of the first metadata source and the data items of the second metadata source;

executing, by a computing device, a preliminary matching algorithm for the one or more selected attributes to generate a preliminary score for each set of a group of data item sets, said each set comprising a formatted data item from the first metadata source and a formatted data item from the second metadata source;

identifying sets which have unrelated data items of the first and second metadata sources based upon the generated preliminary scores;

modifying the group of data item sets to exclude said sets identified as having unrelated data items;

executing, by the computing device, a scoring algorithm for each data item set in the modified group of data item sets, wherein executing the scoring algorithm for the first attributes comprises performing a string comparison between the first string and the fifth string and executing the scoring algorithm for the second attributes comprises performing a string comparison between the third string and the sixth string, and wherein executing the scoring algorithm further comprises combining a score from the string comparison between the first string and the fifth string and from the string comparison between the third string and the sixth string to produce a total match score for the first data item of the first metadata source and the second data item of the second metadata source;

identifying sets which have related data items of the first and second metadata sources based upon the total match scores;

linking the first data item of the first metadata source with the first data item of the second metadata source when the total match score for the first data items of each of the first and second metadata sources is greater than the total match score for the first and second data items of the first and second metadata sources, respectively, and the total match score for the first data items is greater than a threshold matching criterion;

linking the first data item of the first metadata source with the second data item of the second metadata source when the total match score for the first and second data items of the first and second metadata sources, respectively, is greater than the total match score for first data items of each of the first and second metadata sources and the total match score for the first and second data items of the first and second metadata sources, respectively, is greater than a threshold matching criterion;

establishing at least one link between data items of the first metadata source related to data items of the second metadata source identified as being related; and generating a user interface displaying the established link.

34. The method as set forth in claim 33 further comprising determining that a media file associated with an item of data located in one of said metadata sources is accessed by said client and presenting a link associated with said item of data to said client.

* * * * *

UNITED STATES PATENT AND TRADEMARK OFFICE
CERTIFICATE OF CORRECTION

PATENT NO. : 7,644,077 B2  Page 1 of 1
APPLICATION NO. : 10/970602
DATED : January 5, 2010
INVENTOR(S) : Picker et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 597 days.

Signed and Sealed this

Sixteenth Day of November, 2010

David J. Kappos
*Director of the United States Patent and Trademark Office*